(12) United States Patent
Shaffer et al.

(10) Patent No.: US 7,184,533 B1
(45) Date of Patent: Feb. 27, 2007

(54) METHOD AND APPARATUS FOR MIXED MEDIA CONTACT NOTIFICATION SERVICE

(75) Inventors: Shmuel Shaffer, Palo Alto, CA (US); William Joseph Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/457,049

(22) Filed: Dec. 7, 1999

(51) Int. Cl.
*H04M 3/42* (2006.01)

(52) U.S. Cl. .............. 379/211.01; 379/93.09; 379/201.01; 379/201.08; 379/211.02

(58) Field of Classification Search ........... 379/93.09, 379/201.01–201.08, 211.01, 211.02
See application file for complete search history.

(56) References Cited

U.S. PATENT DOCUMENTS

| | | | | |
|---|---|---|---|---|
| 4,313,035 A | | 1/1982 | Jordan et al. ......... | 379/211.02 |
| 4,941,170 A | * | 7/1990 | Herbst ................ | 379/100.07 |
| 5,243,645 A | | 9/1993 | Bissell et al. ........ | 379/211.02 |
| 5,315,636 A | | 5/1994 | Patel ................. | 379/201.07 |
| 5,329,578 A | | 7/1994 | Brennan et al. ....... | 379/211.03 |
| 5,392,342 A | | 2/1995 | Rosenthal ............ | 379/211.03 |
| 5,454,032 A | | 9/1995 | Pinard et al. | |
| 5,548,637 A | | 8/1996 | Heller et al. ......... | 379/201.07 |
| 5,592,541 A | | 1/1997 | Fleischer, III et al. .. | 379/211.02 |
| 5,659,596 A | | 8/1997 | Dunn ................ | 455/456 |
| 5,724,411 A | | 3/1998 | Eisdorfer et al. ...... | 379/93.23 |
| 5,764,731 A | * | 6/1998 | Yablon ............... | 379/88.15 |
| 5,802,160 A | * | 9/1998 | Kugell et al. ......... | 379/211.04 |
| 5,875,240 A | | 2/1999 | Silverman ............ | 379/142.07 |
| 5,905,789 A | | 5/1999 | Will ................. | 379/211.03 |
| 5,949,876 A | | 9/1999 | Ginter et al. ......... | 705/80 |
| 6,091,808 A | * | 7/2000 | Wood et al. .......... | 379/201.04 |
| 6,330,308 B1 | * | 12/2001 | Cheston et al. ....... | 379/88.04 |

* cited by examiner

*Primary Examiner*—Quynh H. Nguyen

(57) ABSTRACT

A method and apparatus for providing an automatic called party locator service by intelligently managing lists of contacts. The apparatus includes a contact list manager (10) where lists of contacts are stored, and a locator (60) capable of sending out location request messages and receiving and handling responses. In some embodiments, the current invention may be integrated with call messaging systems, fax and or e-mail systems. In some cases, advanced features such as message delivery method selection, message customization, contact message retrieval or expiration and automatic call dialing may be enabled. In embodiments which support caller identification capabilities, the invention may be configured to have different behaviors based on the identification of the caller.

24 Claims, 4 Drawing Sheets

METHOD AND APPARATUS FOR MIXED MEDIA CONTACT NOTIFICATION SERVICE

FIELD OF THE INVENTION

The present invention relates to field of communications. More particularly, the present invention is directed to apparatus and methods for providing an automated call contact list, possibly using multiple media, and a locator server to locate an intended message recipient.

BACKGROUND OF THE INVENTION

A large number of products and publications related to locating a desired recipient of an electronic communication exist. A variety of systems exist or have been proposed regarding automatic call forwarding, cellular called party locating, electronic paging of individuals in response to a received message or emails, etc. A wide variety of call processing systems with a wide variety of such features are known.

One example of a feature available with some messaging servers is automatic call distribution (ACD). ACD is particularly useful for distributing calls in a call center. With ACD, calls can be routed to the next available person in the appropriate workgroup or the next available person with the appropriate skills. This is useful for complex call management. For example, ACD can be used to manage a service call into a support hotline which may require being transferred several times to address an issue. However, ACD is generally not helpful for locating a specific person.

Another method commonly used in offices with voice mail systems is to have generally a single administrative person who is presented as a "message taker" for the called party. In such systems, the system may provide a greeting such as: "If you would like to leave a recorded message for this person, press 1; if you would like to speak to someone taking messages for this person, press 2, if you would like to have this person paged, press 3." In some voice mail systems, the called party may leave such instructions on the outgoing greeting, such as "If you would like to speak to may assistant, John Doe, please press #423." Both of these methods are inadequate to rapidly locate someone because there is no guarantee that the assistant will be available.

In modern business environments, rapidly locating someone is becoming increasingly more difficult. This is especially true with the reduced levels of administrative support staff found in many offices. It is common to call someone and find them away from their desk. Call forwarding can help, but it does not solve the problem in many situations. For example, if an individual knows that they will be at an alternate work site all day, they may choose to have their calls forwarded from their regular phone number to the alternate phone number. However, if the individual steps away from the phone at the alternate work site, or if the individual fails to properly activate a call-forwarding feature, an urgent or emergency phone call may go unanswered.

In addition, call forwarding services usually manage all incoming calls the same way regardless of their origin. An employee working off-site may be very interested in enabling their manager or spouse to make immediate contact but would prefer to have their co-workers leave a message. Additional services such as call blocking or custom rings can be used in tandem with call forwarding, but they can be inconvenient to use and it can be difficult and time consuming to configure and reconfigure these features.

For urgent contacts, therefore, it is often necessary for the calling party to make multiple sequential phone calls or e-mails to a series of different people who might know where the called party is. This process is time consuming and further may require the called to have maintained an accurate, up-to-date list of alternative contacts for an individual. Creating and maintaining a list of people to contact by phone or e-mail when searching for a particular person can be time consuming, difficult and error-prone. The list may be incomplete, inaccurate, obsolete and/or inappropriate for that situation, thereby reducing the chances of locating the person.

Making multiple sequential contacts to locate a party to receive an urgent call, such as sending multiple e-mails or leaving multiple voice messages can further be problematic because the responses may filter back over a long time period. In trying to locate a party for an emergency contact in the morning, an hour might spent working through a long contact list leaving messages for those contacts that were not available. As a result, responses might filter back all afternoon, long after the party was located or long after the emergency was resolved.

Many of these issues can be dealt with by employing administrative staff to answer phones, manage contact lists and pursue contacts. However, this is an expensive solution.

What is needed is a method or an apparatus for automatically locating a called party via contacts.

SUMMARY OF THE INVENTION

The present invention is directed to systems and methods that allow automated locating of called parties by means of an automated contact list. The invention intelligently manges lists of contacts and intelligently manages notification messages to contacts. In some embodiments of the invention, the caller may be able to select options such as degree of urgency or the type or types of contact media to use. This will determine, in part, how the contact notification manager attempts to contact the called party.

In some embodiments, the current invention may be integrated or interact with other automated systems such as multimedia messaging systems, allowing sending messages via various media such as email, voice mail, or paging. In various embodiments, the queries that are sent out may be retrieved, recalled or expired after a preconfigured expiration time has elapsed and/or after the query is no longer relevant or necessary. In various embodiments of the invention, lists of phone, e-mail, or fax contacts can be configured using a phone keypad associated with a telephone or by a keyboard associated with a personal computing device. In one embodiment, incoming calls may be screened and sorted into categories, each of which might activate a different contact list and/or set of actions.

A further understanding of the invention can be had from the detailed discussion of specific embodiments below and to the following drawings.

DESCRIPTION OF SPECIFIC EMBODIMENTS

For purposes of clarity, this discussion refers to devices, methods, and concepts in terms of specific examples. However, the method of the present invention may operate with a wide variety of types of communication devices and systems. It is therefore intended that the invention not be limited except as provided in the attached claims.

Furthermore, it is well known in the art that logic systems can include a wide variety of different components and different functions in a modular fashion. Different embodiments of a system can include different mixtures of elements and functions and may group various functions in different ways while maintaining a similar overall operation. For purposes of clarity, the invention is described in terms of systems that include many different innovative components and innovative combinations of components and is described according to a particular grouping of components. No inference should be taken to limit the invention to combinations containing all of the innovative components listed in any illustrative embodiment in this specification nor to limit the invention to specific groupings of functional components of data elements, except as provided in the attached claims.

Figure 1:
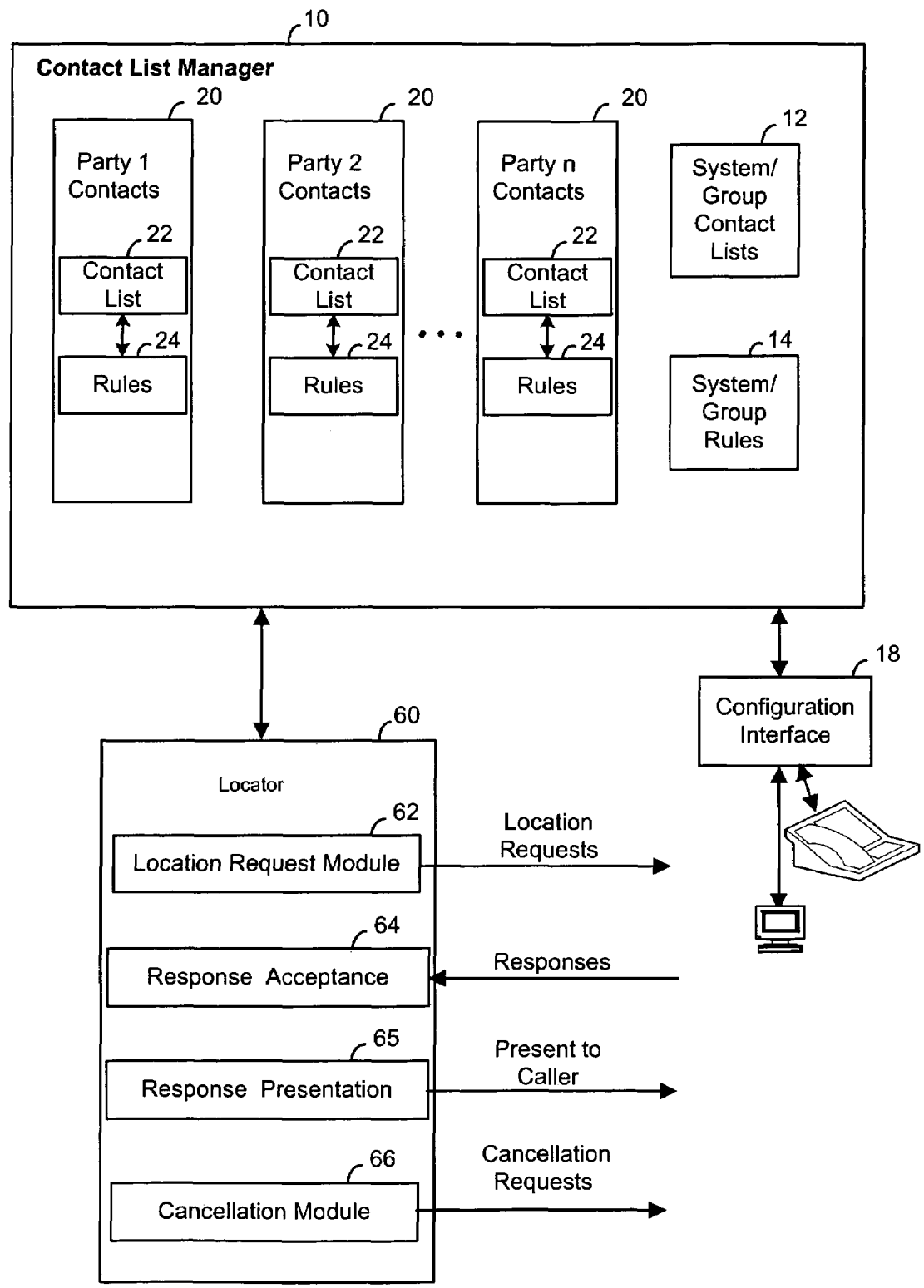
FIG. 1 is a simple block diagram showing a contact list manager and a locator according to one embodiment of the invention.

The present invention in specific embodiments can be understood to include two different aspects: an automatic contact list manager and a called party locator. These aspects can operate separately or together according to specific embodiments to facilitate locating a called party as described below. FIG. 1 is a simple block diagram showing a contact list manager and a locator according to one embodiment of the invention.

Figure 2:
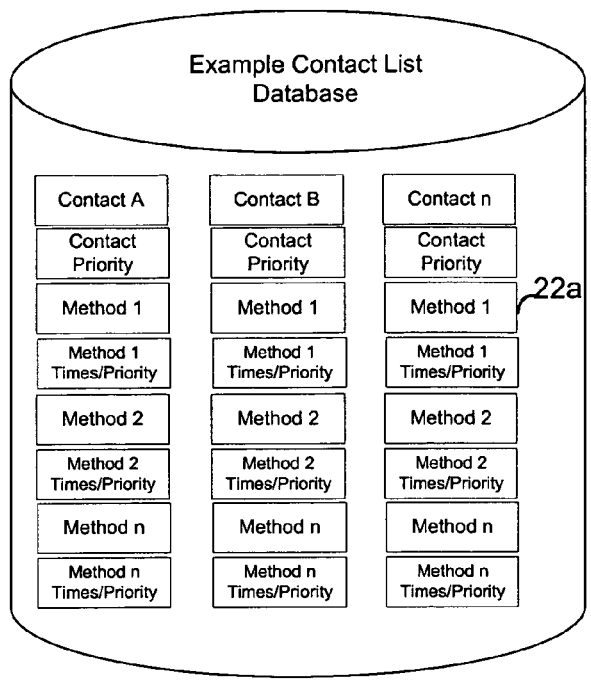
FIG. 2 is a diagram of an exemplary contact list according to one embodiment of the invention.
Figure 3:
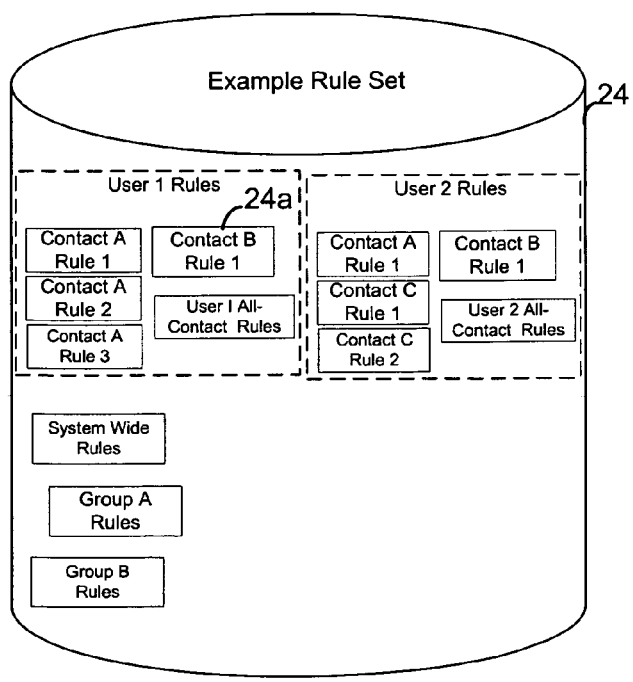
FIG. 3 is a diagram of an exemplary rule set according to one embodiment of the invention.

According to one aspect, the present invention includes a contact list manager 10. The contact list manager stores entries 20 for one or more users of the system (i.e. parties receiving calls or locator requests), and these entries, in one embodiment, can be further understood to comprise one or more lists of contacts 22 and one or more rule sets 24. In a further embodiment, a contact list is associated with one or more rule sets 26. Details of an exemplary contact list are shown in FIG. 2, including a number of individual contacts 22a. Details of an exemplary rule set are shown in FIG. 3, including a number of individual rules 24a.

According to an embodiment of the invention, a contact in a contact list may have associated with it one or more methods for communicating with the contact, such as phone numbers, fax numbers, pager numbers, and/or e-mail addresses. For example, contact C's records may include a phone number, a fax number, pager number and/or an e-mail address.

In some embodiments of the current invention, a contact's records may include context sensitive information. For example, contact C's records may include a phone number for use on weekdays between the hours of 9 AM and 5 PM and another phone number for use evenings and weekends. A contact's record may also include other characteristics associated with a particular contact according to specific embodiments. For example, a weekday number may be utilized for any contacts, including low-priority contacts, while a weekend number or pager number may be flagged for use only with a critical priority contacts.

Furthermore, contact C's records may include additional phone numbers which may only be used one time only or on exeptional occasions such as a phone number for use this Friday between 2 and 4 PM. The operations of these contact list may be governed by various rules in the rule set. It will be understood to those of skill in the art that the representative data illustrations are for purposes of explanation and that various data about contacts, including rules, may be organized differently in different types of programming systems, including objects oriented data and functional entities, SQL data entries, etc. It will also be understood that the data described herein may be incorporated and intermixed with other messaging system data, such as voice mail box data or billing data.

In additional embodiments of the current invention which support identification of callers, the contact list manager may store some or all of the data related to identification. In some embodiments, additional configuration information regarding system behaviors related to caller identification may be stored in the contact manager. For example, a user may commonly get calls from a variety of people which may be described by the user. The user may associate callers, contacts and/or contact methods with specific system behaviors according to contacts and/or rules. These associations may be stored in the contact list manager. Additionally, the user may choose to create categories to group callers, contacts and/or contact methods and relate these categories with specific system behaviors. These categories may also be stored in the contact list manager. In other embodiments of the current invention, the identification, association, and/or categorization data may be maintained and/or managed elsewhere.

In a further embodiment of the invention, a configuration interface 18 may be used to input data or to configure contact manager 10. This interface may include a telephone keypad interface, a graphical user interface on a computing system, or other known means for accepting input into a messaging system.

In a further embodiment, contact manager 10 includes system/group contact lists 12 and system group rules 14. This data allows an administrator or other person to set certain operating parameters for multiple users or for all users.

According to a further embodiment, a called party locator 60 receives requests for locating a called party service and sends messages to one or more contacts in a contact list. Some embodiments of the current invention may be integrated with other systems such as call management systems and/or multimedia messaging systems which may manage and submit requests for service to the called party locator server. In some embodiments of the current invention, the messages sent by the called party locator server may be e-mail messages. In other embodiments of the current invention, the called party locator service may send one or more types of messages.

Examples of the types of messages that the called party locator can send include, but are not limited to, e-mail, voice mail, page, alternate phone calls, and fax. In some embodiments of the invention, where more than one type of messaging is available, the caller may be prompted to select a preferred contact mode. For example, if User A attempted to contact User B using the called party locator service. User A might be prompted to select if the contact messages should go out as faxes, e-mails and/or voice messages.

An example of the message that the called party locator service might send is a voice mail message which includes the following content: "Do you know where John is? An important caller is attempting to contact him urgently. If you know where John is, please respond to this message with his location."

In some embodiments of the current invention, the called party locator server sends preconfigured messages to the contact lists. In other embodiments of the current invention, the caller may modify a preconfigured message. For example, a caller may be prompted to record a name for inclusion in the message. An example of a modified preconfigured message that the called party locator server might send would be a voice mail which includes the following content: "Do you know where John is? <Caller B's name inserted here> is attempting to contact him urgently. If you know where John is, please respond to this message with his location."

In further embodiments of the current invention, the caller may add his or her own comments to the preconfigured message. An example of such a message would be a voice mail that includes the following content: "Do you know where John is? <Caller A's name inserted here> is attempting to contact him urgently. <Please help me find John, his son is in the emergency room with a broken leg.> If you know where John is, please respond to this message with his location." In other embodiments of the current invention, the caller may create their own custom message.

In one embodiment, formatting and sending one or more location requests is handled by locator request module 62, which may be understood as a logical system communication module capable of configuring and transmitting messages.

In some embodiments of the current invention, the invention may give instructions to the contacts describing methods for contacting the caller with responses to the contact message. Examples of these methods may include, but are not limited to a phone number, e-mail address and/or fax number. This information would be passed along to the contacts possibly, but not necessarily, in the contact message. An example of such a message might be an e-mail message that includes the text: "Do you know where John is? <Caller A's name inserted here> is attempting to contact him urgently. If you know where John is, please let <Caller A's name inserted here> know his location by contacting them at: <Caller A's phone number inserted here> or <Caller A's e-mail address inserted here>".

In other embodiments, replies to contact messages may be submitted and may be automatically received and processed. So, for example, caller A may activate the called party locator service for party B, party C may respond to the contact message by recording a response indicating the location of party B and the system of the invention may automatically play the response for caller A.

A recorded response might include the content, "I know where John is, call him at 555- 1212." In other embodiments of the invention, party C might be prompted to type in the phone number where John is located. The called party locator server may then identify the number and automatically dial it for party A, or it may relay the number to party A for manual dialing.

In some cases, the message might be an e-mail. A response to an e-mail inquiry might be another e-mail including the following text: "I know where John is, call him at 555-1212". In some embodiments, this e-mail may be sent to the system according to the invention be forwarded to the caller. In other embodiments of the current invention, the e-mail may be automatically converted to synthetic speech and played for caller A.

In further embodiments, of the invention, the messaging server may be able to extract the phone number from the response for automated dialing. For example, some fax messaging servers have the ability to scan forms for data using a variety of technologies such as optical mark reading (OMR) technology which is commonly used in standardized testing. In this example, the contact may be faxed the contact request with an OMR form that the contact may fill out and fax back. E-mail responses may be similarly managed using a variety of technologies such as optical character recognition (OCR). Similarly, various types of speech recognition software may be integrated with the invention so that a phone number may be extracted from a voice response. The invention may then automatically dial the phone number for the caller.

In one embodiment, receiving responses is handled by acceptance module 64 and presentation to the caller is handled by presentation module 65.

In some embodiments of the current invention, the locator uses default timers or preconfigured timers to determine when a locator request has expired and may the take appropriate action to recall the request. In other embodiments, the caller may be prompted to set the expiration timer. In this way, contact are not bothered by messages inquiring about the whereabouts of a colleague long after the need to contact them has expired.

Similarly, in some embodiments of the invention which include automatic receipt and processing of responses, the invention can recall or cancel outstanding contact messages once the party of interest has been located. So, for example, if 10 messages are sent out in an effort to locate party B, party C might respond quickly with party B's location. The locator server would then recall or cancel the other 9 outstanding notifications so that the other 9 contacts are not unnecessarily bothered. In some embodiments of the current invention, the outstanding contacts are automatically recalled, cancelled or expired when party B's new location is automatically dialed.

In further embodiments of the invention, the original caller may choose to have outstanding locator requests cancelled at various steps in the process. In one embodiment, active cancellation of outstanding locator requests is handled by module 66.

In some cases, the current invention may be integrated with other systems such as multimedia messaging systems, voice mail or e-mail systems which support the retrieval, cancellation or expiration of messages.

In a further embodiment of the invention, the called party locator system can be configured to respond according to the identity of the caller. For example, a user may be interested in having their children or managers contact them as rapidly as possible, but might not want their colleagues on the contact list bothered by a telemarketer.

In some embodiment of the invention, the user may create categories of callers. Each individual caller or category of callers might have a different set of characteristics such as, but not limited to, the contact list, contact methods and default expiration time. In some embodiments of the invention, the called party locator server may not send out any notification unless the caller is identified in a particular category. In an embodiment of the invention, callers may be identified or they may be prompted to identify themselves. One example of a way to identify a caller is by using caller ID, however other methods for verifying the identity of a caller are equally valid and may be used instead of or in conjunction with caller ID.

In a further embodiment, locator requests are processed based on a priority, with high priority requests providing more extensive location options or efforts. The priority given to a location request may be selectable by the caller, based on a caller identification, based on entry of a priority code or password, or any combination of these. Priority indications may be incorporated into contact lists and/or rules.

Figure 4:
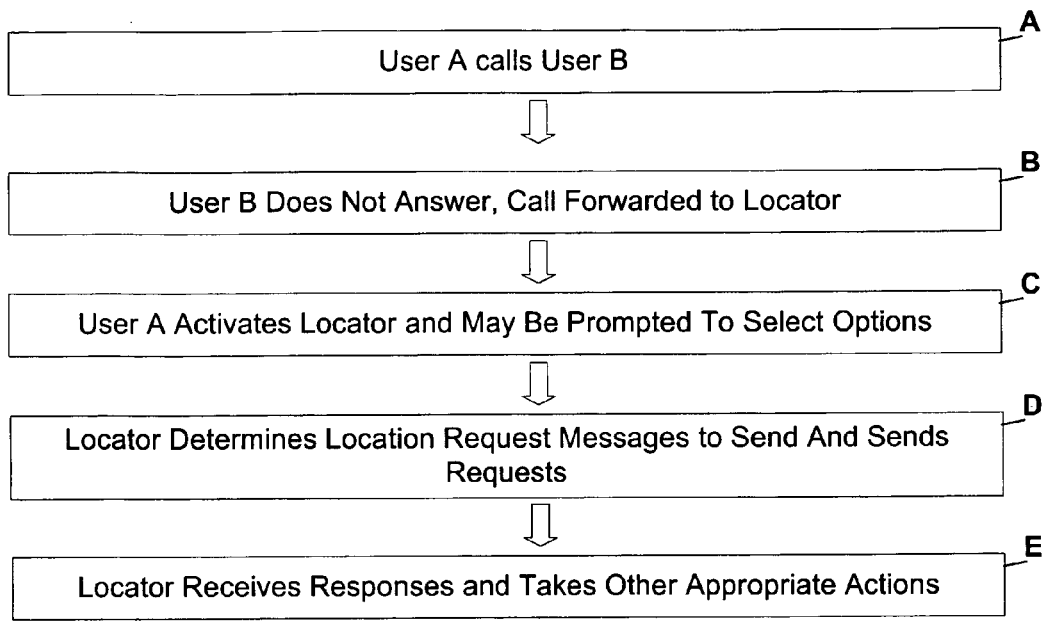
FIG. 4 is a flowchart illustrating a method for called party locating according to an embodiment of the invention.

FIG. 4 is a flowchart illustrating a method for called party locating according to an embodiment of the invention. The method begins when User A calls User B (Step A). If User B does not answer the call, the call is forwarded to a messaging system with locator capabilities (Step B). User A may be prompted with one or more options, including the ability to activate a called party locator feature (Step C). User A may choose to activate the called party locator feature, upon which the locator determines the location request messages to send and then sends these messages (Step D). The locator server receives the message that User A is requesting a location service to locate User B, and the locator server then sends location request messages in accordance with user B's list and optionally by reference to applicable rules (Step E).

Figure 5:
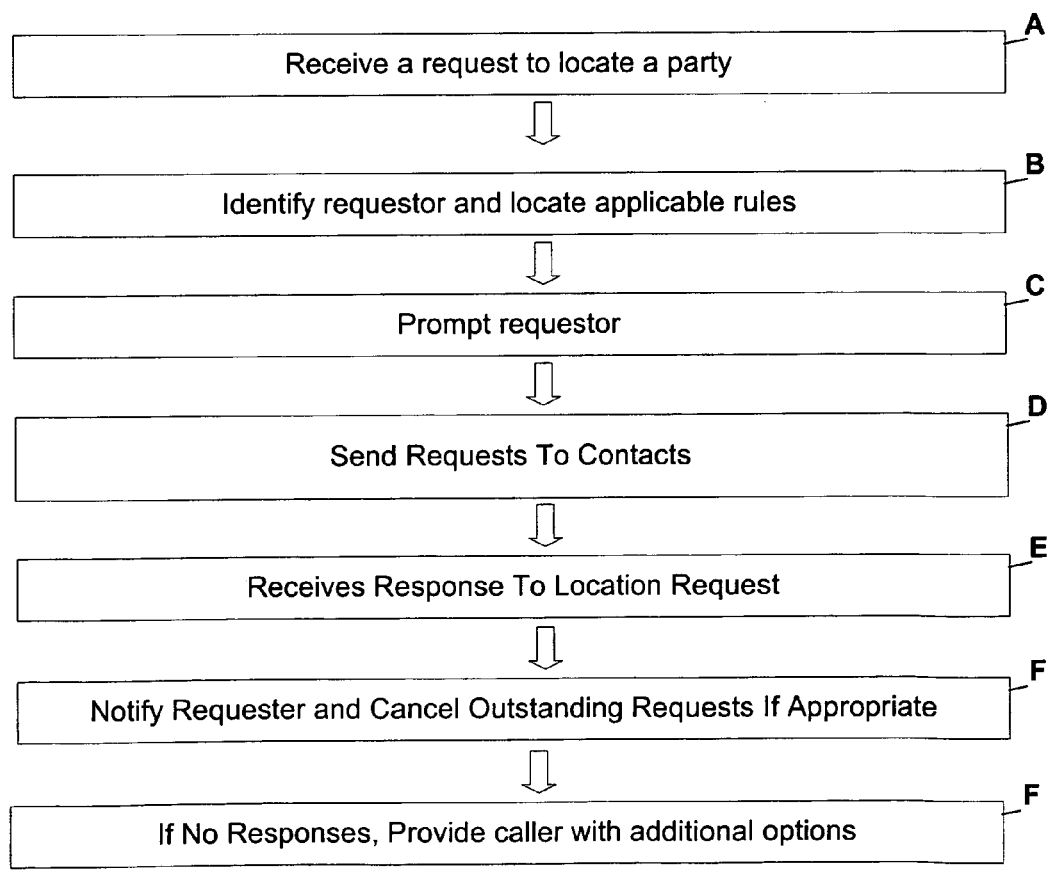
FIG. 5 is a flowchart illustrating a method with steps according to an alternative embodiment of the invention.

FIG. 5 is a flowchart illustrating a method with steps according to an alternative embodiment of the invention. The method begins when a locator receives a request to locate a party (Step A). The requestor may then be identified and looked up in rules or data associated with the party (Step B). If the requestor is validated as authorized to activate a locator feature, then the requestor may be prompted with one or more options and for input regarding items such as: message modifications, customizations and/or additions, message expiration timer settings, priority, choices of media for contact (Step C). Based on options selected and configuration information and rules, the called party locator system then sends appropriate location requests to contacts (Step D). The recipients of the location requests may reply to the called party locator system (Step E). The called party locator system complies the responses and takes appropriate action to alert the requester and to cancel remaining outstanding messages (Step F). If no replies indicate the location of the called party, or the timer expires, the requestor is notified that the system may not locate User B and may provide additional options for User A, such as forwarding to a voice messaging system (Step G).

The called party locator server can be implemented in hardware and/or software. In some embodiments of the invention, the called party locator server can be implemented entirely or in part in a client device, such as but not limited to a telephone, a telephony computer, an IP phone, etc. In other embodiments of the invention, the called party locator can be implemented entirely or in part in call processing devices such as, but not limited to: a telephony-over-LAN (ToL) gatekeeper, a private branch exchange (PBX), or a messaging server.

In some embodiments of the invention, callers can interact with the called party locator system through dual tone multi-frequency (DMTF) or digital phone keystrokes. In other embodiments of the invention, callers may interact with the called party locator system through one or more modes including, but not limited to a personal computer keyboard or voice commands.

The invention may be embodied in a fixed media or transmissible program component containing logic instructions and/or data that when loaded into an appropriately configured computing device cause that device to perform interpolation according to the invention.

Figure 6:
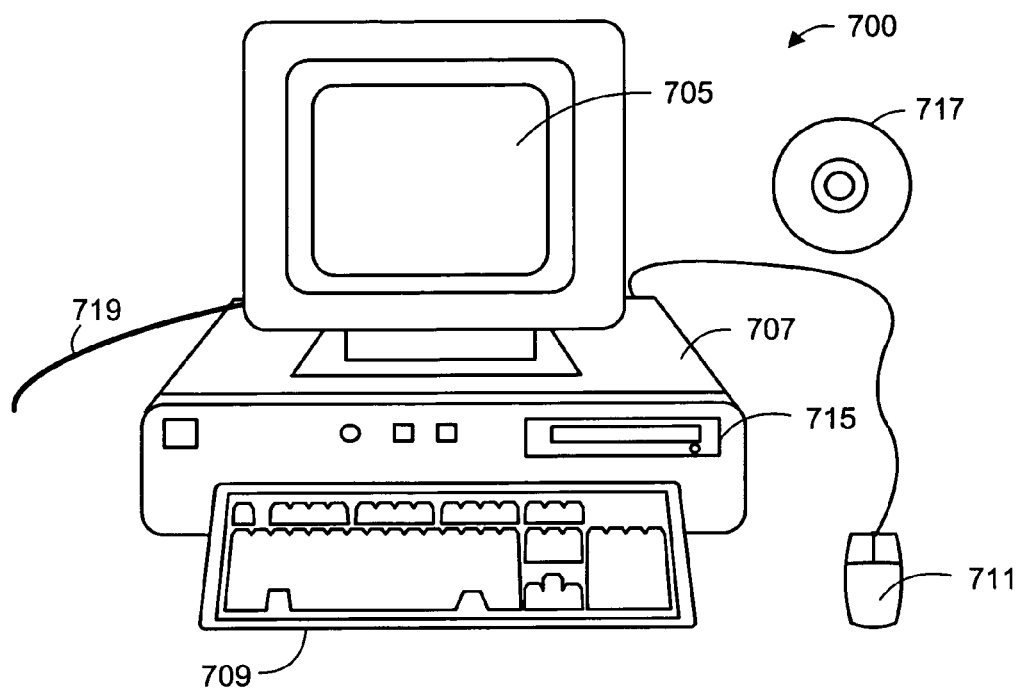
FIG. 6 is a diagram illustrating an example computer device that can embody aspects of the present invention.

FIG. 6 is a diagram illustrating an example computer device that can embody aspects of the present invention. FIG. 6 shows digital device 700 that may be understood as a logical apparatus that can read instructions from media 717 and/or network port 719. Apparatus 700 can thereafter use those instructions to direct a messaging or voice mail system as is known in the art and that further includes the components of the invention. One type of logical apparatus that may embody the invention is a computer system as illustrated in 700, containing CPU 707, optional input devices 709 and 711, disk drives 715 and optional monitor 705. Fixed media 717 may be used to program such a system and may represent a disk-type optical or magnetic media or a memory. Communication port 719 may also be used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language which may be used to create an ASIC or PLD that operates as herein described. The invention also may be embodied within the circuitry or logic processes of other digital apparatus, such as telephones and telephone systems.

The invention has now been explained with reference to specific embodiments. Other embodiments will be apparent to those of skill in the art. In particular, configuring and interfacing with the invention with a phone keypad, voice commands or personal computer keyboard has been described. Configuration and interaction with the invention is meant to be achieved by any means of data communication. This meaning does not change the essential operation of the invention.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method attempt communication with a called party comprising:
   determining two or more contacts associated with the called party from a contact list associating one or more contacts with each of a plurality of called parties;
   determining a first contact method associated with a first contact of the two or more contacts, and a second contact method associated with a second contact of the two or more contacts;
   automatically sending a message using the first contact method to the first contact and automatically sending the message using the second contact method to the second contact, said message requesting a contact method associated with the called party;
   receiving a response to said message from the first contact, said response indicating a third contact method associated with said called party; and
   automatically using the third contact method to attempt to communicate with said called party.

2. A method according to claim 1 wherein said contact list comprises:
   one or more contact methods associated with for each contact; and one or more rules associated with each contacts or contact method, each of the one or more rules indicating one or more conditions for sending the message.

3. A method according to claim 1 wherein said first, second and third contact methods comprise one or more methods selected from the group consisting of:
one or more telephone numbers,
one or more fax numbers,
one or more pager numbers,
one or more cell phone numbers, and one or more e-mail addresses.

4. A method according to claim 2 wherein said contact list associates contact information with said contacts or said contact methods, the contact information designating conditions for usage of said contacts or said contact methods.

5. A method according to claim 2, further comprising:
cancelling the message sent using the second contact method in response to the received response.

6. The method according to claim 1 further comprising:
allowing a called party to configure said contact list.

7. A method according to claim 1, further comprising:
identifying the called party; and
using the identity to determine system behavior.

8. A method according to claim 1 wherein said called party may configure system behavior for a calling party.

9. A method according to claim 1 wherein said message is predetermined prior to determining the first contact.

10. A method according to claim 1 wherein the responses comprises information associated with the called party.

11. A method according to claim 1 wherein said messages may be automatically cancelled, expired or recalled based on a timer.

12. A method according to claim 1 wherein said messages may be automatically cancelled, expired or recalled based on the successful establishment of contact between said calling party and said called party.

13. A method according to claim 1 wherein said third contact method includes a telephone number.

14. A method according to claim 1 wherein said second contact method includes a telephone number, and said first contact method includes an e-mail address.

15. A method according to claim 1 further comprising automatically extracting said third contact method from said response.

16. A method according to claim 15 wherein said first contact method and said second contact methods comprise a telephone numbers, said third contact method is a telephone number, and said automatically extracting said third contact method from said response includes using speech recognition software to extract said third contact method.

17. A method according to claim 1 further comprising automatically extracting said third contact method using optical recognition software.

18. A method according to claim 1 wherein receiving the response comprises recording said response, and further comprising transmitting audio associated with the third contact method to said caller.

19. A method according to claim 1, wherein said first contact method and third contact methods are of different multimedia types.

20. A method according to claim 19 wherein one of said first and second contact methods is a telephone number and the other of said first and second contact methods is a text-based message.

21. An apparatus to attempt communication with a called party comprising:
a contact list manager comprising a list associating one or more contacts with each of a plurality of called parties, the contact list manager to determine two or more contacts associated with the called party, to determine a first contact method associated with a first contact of the two or more contacts, and to determine a second contact method associated with a second contact of the two or more contacts; and
a locator to automatically send a message using the first contact method to the first contact, and to automatically send the message using the second contact method to the second contact, said message requesting a contact method associated with the called party, to receive a response to said message from the first contact, said response indicating a third contact method associated with said called party; and to automatically use the third contact method to attempt to communicate with said called party.

22. An apparatus according to claim 21 further comprising:
one or more contacts lists associated with one or more called parties; and
one or more rule sets associated with the one or more called parties.

23. An apparatus according to claim 21 further comprising:
a system contact list comprising contacts associated with more than one called party; and
a system rule sets associated with more than one called party.

24. An apparatus according to claim 21 further comprising:
a cancellation module for determining to cancel outstanding messages and to send cancellation requests.

* * * * *